F. SWINGLY.
NUT-LOCK.

No. 186,066. Patented Jan. 9, 1877.

WITNESSES:
H. Rydquist
John Goethals

INVENTOR:
F. Swingly
BY
Munn & Co
ATTORNEYS.

UNITED STATES PATENT OFFICE.

FREDERICK SWINGLY, OF BUCYRUS, OHIO.

IMPROVEMENT IN NUT-LOCKS.

Specification forming part of Letters Patent No. 186,066, dated January 9, 1877; application filed September 16, 1876.

*To all whom it may concern:*

Figure 1:
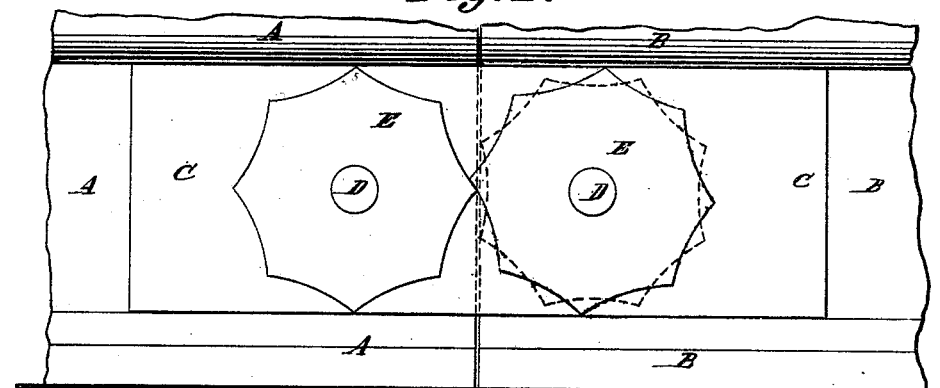
Figure 2:
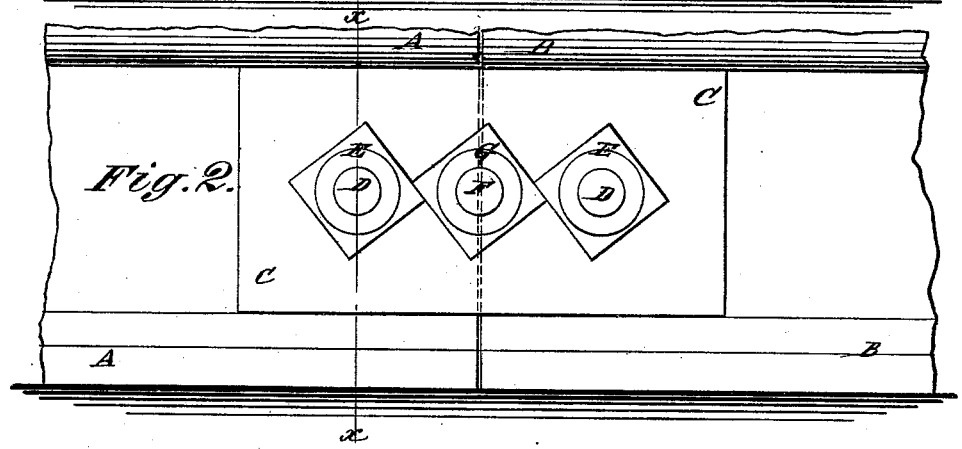
Figure 3:
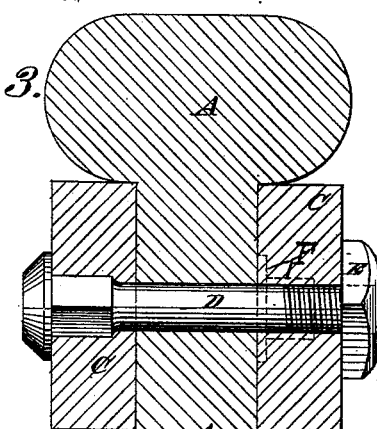

Be it known that I, FREDERICK SWINGLY, of Bucyrus, in the county of Crawford and State of Ohio, have invented a new and useful Improvement in Nut-Locks, of which the following is a specification:

Figure 1 represents a railroad-rail joint to which my improved nut-lock has been applied. Fig. 2 is the same view as Fig. 1, but showing another form of the nuts. Fig. 3 is a cross-section of the same, taken through the line $x\,x$, Fig. 2.

Similar letters of reference indicate corresponding parts.

The object of this invention is to furnish an improved device for preventing the bolts from working loose in railroad-joints, and in other places where they will be subjected to an intermittent or continuous jarring.

The invention consists in the combination of two or more nuts with each other, in such a way that the backward movement of either will tend to move the other forward, causing them to mutually lock each other, as hereinafter fully described.

A B represent the adjacent ends of two railroad-rails, forming a joint. C are the fish-plates, which are secured to the rails A B by the bolts D and nuts E. The nuts E may be made square, as shown in Fig. 2; or they may have more than four sides or faces, as shown in Fig. 1, and their sides or faces may be flat or concaved, as may be desired.

Where practicable, the bolts may be placed at such a distance apart, or the nuts may be made of such a size, that the angles of the nuts will strike against each other when they both approach the line joining their centers at the same time; but when either stands with the center of either side upon the line joining the centers of said nuts, the other nut may be turned freely.

In applying the lock, one of the nuts is screwed up, and is left with the center of one of its sides upon the line joining their centers. The other nut is then turned up, and is left with its angle about upon the line joining the centers of the nuts. The first nut is then turned back until its angle strikes against the angle of the second nut. When thus arranged, any tendency of either nut to turn off will tend to turn the other nut on, so that they will mutually lock each other.

In case the bolts D are so far apart, or the nuts E are so small, that their angles will not strike against each other, an intermediate bolt, F, and nut G are used, the said bolt only passing through the outer fish-plate C, as indicated in dotted lines in Fig. 3. In this case the intermediate nut is screwed up, and left with its opposite sides at right angles with the line joining the centers of the three nuts.

The other nuts are then screwed up, and left with their inner angles about upon the line joining the centers of the three nuts, and the intermediate nut is then turned back, bringing its opposite angles into contact with the inner angles of the other nuts, and the three nuts will mutually lock each other.

Having thus described my invention, I claim as new and desire to secure by Letters Patent—

The combination, with a fish-plate that connects the ends of two railroad-rails, of the bolts and the angular nuts, the latter coming in contact only when their corners reach, or nearly reach, the plane that passes through all the bolts, whereby all the touching nuts are locked, as shown and described.

FREDERICK SWINGLY.

Witnesses:
ISAAC CAHILL,
SHANNON CLEMENTS.